US012725552B1

(12) United States Patent
Zhang et al.

(10) Patent No.: US 12,725,552 B1
(45) Date of Patent: Sep. 1, 2026

(54) PARALLELIZING DETERMINATION OF PIXEL VALUES FOR USE WITH A COLOR FILTER ARRAY

(71) Applicant: Amazon Technologies, Inc., Seattle, WA (US)

(72) Inventors: Lifu Zhang, Sunnyvale, CA (US); Yuan Wang, San Jose, CA (US); Hao Hu, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/196,313

(22) Filed: May 1, 2025

(51) Int. Cl.
*G09G 3/20* (2006.01)
*G09G 3/34* (2006.01)

(52) U.S. Cl.
CPC ........... *G09G 3/2044* (2013.01); *G09G 3/344* (2013.01); *G09G 2320/0242* (2013.01); *G09G 2360/18* (2013.01)

(58) Field of Classification Search
None
See application file for complete search history.

(56) References Cited

U.S. PATENT DOCUMENTS

| | | | | |
|---|---|---|---|---|
| 9,245,485 | B1 * | 1/2016 | Hu | G09G 3/344 |
| 11,132,823 | B2 * | 9/2021 | Itou | G06F 3/0485 |
| 11,450,262 | B2 * | 9/2022 | Ben-Dov | G09G 3/2044 |
| 2019/0035049 | A1 * | 1/2019 | Backer | G06T 15/005 |
| 2019/0051020 | A1 * | 2/2019 | Modaikkal | G06T 11/10 |
| 2025/0329306 | A1 * | 10/2025 | Nomura | G09G 3/344 |

* cited by examiner

*Primary Examiner* — Kenneth Bukowski
(74) *Attorney, Agent, or Firm* — K&L Gates LLP

(57) ABSTRACT

Devices and techniques are generally described for parallelizing determination of image grayscale pixel values based on their color filter array locations in e.g., a frame buffer associated with an electrophoretic display device. An example method may include receiving an image stored in a frame buffer associated with an electrophoretic display of a computing device, wherein the electrophoretic display includes black and white ink and a color filter array overlaid thereon; identifying, for the first image, a first processing region of the frame buffer, a second processing region of the frame buffer, and a third processing region of the frame buffer; determining, using a serial processing operation, grayscale values for pixels in the first processing region; determining, using a parallel processing operation, grayscale values for pixels in the second processing region; and determining, using the serial processing operation, grayscale values for pixels in the third processing region.

20 Claims, 5 Drawing Sheets

PARALLELIZING DETERMINATION OF PIXEL VALUES FOR USE WITH A COLOR FILTER ARRAY

BACKGROUND

Electronic devices (e.g., electronic reader (e-reader) devices, desktop and laptop computers, smartphones, tablet computers, televisions, wearable devices, display devices) may include electrophoretic displays to present various content and information (e.g., text, images, video, etc.) to users. Performance of these displays may vary depending on various technical characteristics. For example, certain displays may have better color consistency or contrast ratios than other displays. In another example, certain displays may be able to output a wider range of colors, or colors with different intensities, than other displays. Further, certain displays may render content faster than other displays. As a result, electrophoretic displays may affect a user experience of the corresponding electronic devices. Displays that can produce high quality images, more efficiently output color, and/or decrease rendering time for content may be desired.

DETAILED DESCRIPTION

In the following description, reference is made to the accompanying drawings which illustrate several examples for the present disclosure. It is understood that other embodiments may be utilized and that mechanical, compositional, structural, electrical operational changes may be made without departing from the spirit and scope of the present disclosure. The following detailed description is not to be taken in a limiting sense, and the scope of the embodiments of the present disclosure is defined only by the claims of the issued patent.

In accordance with aspects, the present disclosure relates to parallelizing determination of image grayscale pixel values based on their color filter array (CFA) locations in an electrophoretic display to reduce processor latency while ensuring accurate color representation by the display. According to various embodiments, the present disclosure may include receiving a 24-bit RGB888 image stored in a frame buffer associated with an electrophoretic display of a computing device, dithering the received RGB888 image to 5 bit (for a given pixel with a 5 bit red value, a 5 bit green value, and a 5 bit blue value), employing color enhancement and CFA mapping to determine a CFA channel corresponding to that pixel (e.g., red) and selecting a color channel value corresponding to that CFA channel (e.g., the 5 bit red value), further dithering the 5-bit image to a 4-bit image to avoid banding issues, and storing the resulting 4-bit image along other selected information. As will be described more fully below, to iterate through each line of an input image one by one, the present disclosure involves a unique combination of parallel processing and optimized coding techniques that enable efficient handling of both aligned and non-aligned pixels within rows. For instance, when encountering 8-pixel aligned regions, vectorized operations may be utilized to accelerate color enhancement, CFA mapping, dithering from 5-bit to 4-bit, and other functions simultaneously across multiple columns using a fixed index defining the start-of-set columns. This parallelization technique improves performance while maintaining image quality by minimizing processing overhead and reducing data transfer rates between registers.

Figure 1:
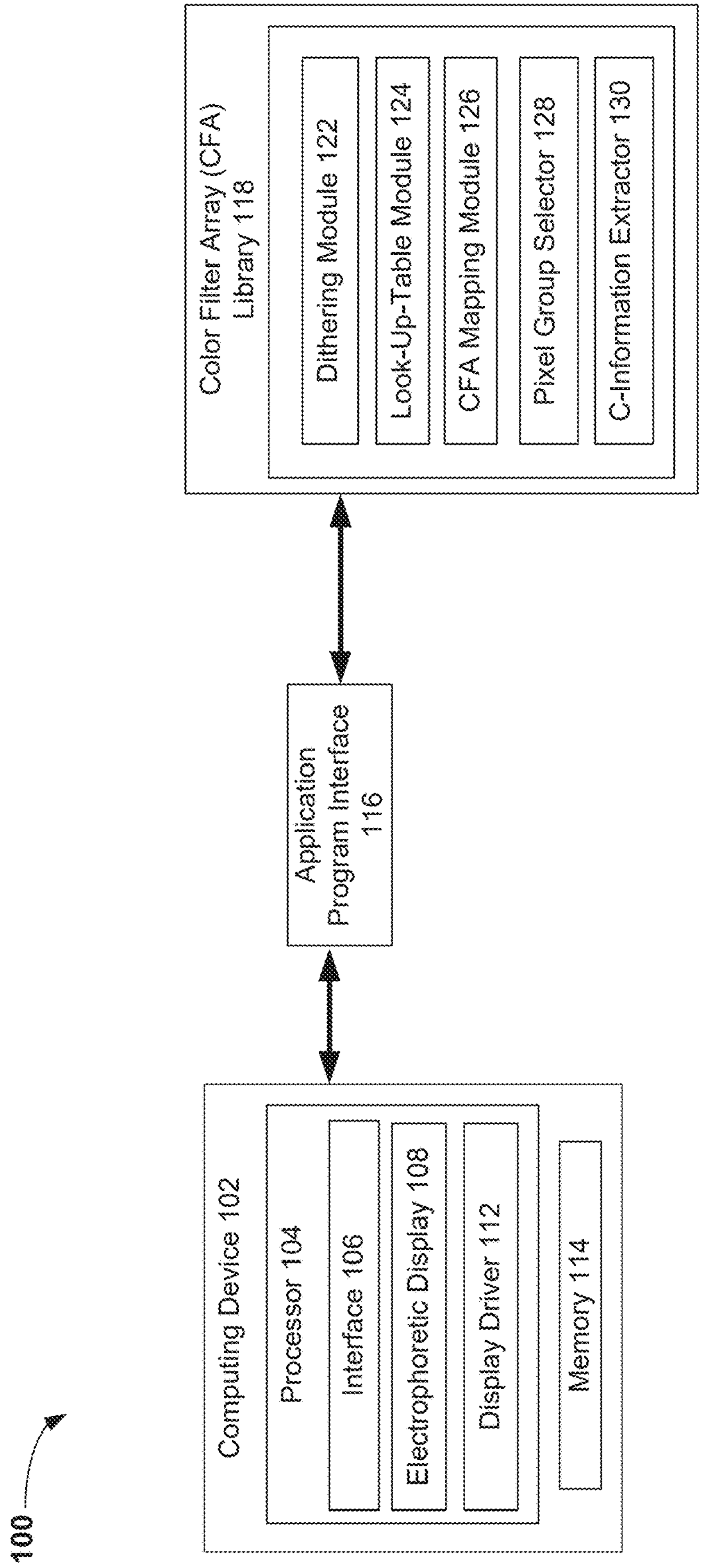
FIG. 1 illustrates a block diagram illustrating an example system for enhancing determination of pixel values for use with a color filter array (CFA), in accordance with various aspects of the present disclosure.

FIG. 1 is a block diagram of a system 100 including a computing device 102 having an electrophoretic display and communicating with a CFA library 118 via an application program interface (API) 116 for parallelizing determination of grayscale pixel values for use with a CFA associated with the electrophoretic display, in accordance with various embodiments of the present disclosure. The computing device 102 may include at least one processor 104 configured to control and execute a plurality of modules including but not limited to an interface 106, an electrophoretic display 108, and a display driver 112. As illustrated, the electrophoretic display 108, which may be an electronic book (eBook) reader or tablet computer. It will be appreciated, however, that these components of the electrophoretic display 108 are for context and illustrative purposes, and not all of these components are necessary for an electrophoretic display 108 to perform the example implementations described herein. The general working principles of the electrophoretic display 108 will be described below with respect to FIGS. 2 and 3. It will be appreciated that the description with respect to device 102 and electrophoretic display 108 is exemplary, and that other architectures and configurations may be utilized. In accordance with one or more implementations, systems and approaches disclosed herein are utilized in combination with systems and approaches disclosed in U.S. patent application Ser. No. 19/094,409 filed Mar. 28, 2025. U.S. patent application Ser. No. 19/094,409 and any patent application publications thereof and patents issuing therefrom are hereby incorporated herein by reference.

Memory 114, which is coupled to the processor 104, may be a non-transitory machine readable medium storing at least one set of data structures or instructions (e.g., software) embodying or utilized by at least one of the techniques or functions described herein. For example, memory 114 may include a frame buffer of the electrophoretic display 108 and store at least a portion of information obtained by the computing device 102.

According to one embodiment, an application, which may be a mobile or web-based application (e.g., native iOS or Android Apps), may be downloaded and installed on the computing device 102 for instantiating various modules for interacting with a user of the application, retrieving and displaying various information to the user via the computing device 102, among other features. For example, such an application may be used to request and consume electronic content, such as an eBook, via the electrophoretic display 108, obtained from the CFA library 118 or other computing system, server, or platform deployed within e.g., a Cloud infrastructure, using the API 116.

The CFA library 118 may be implemented as a callable library of the computing device 102 which includes a collection code or functions that can be accessed by applications and other software running on the computing device 102 via the API 116. In another embodiment, the CFA library 118 may be hosted by a separate computing device (not shown) that is remote or local to the computing device 102. The processor 104 of the computing device 102 may be configured to control and execute a plurality of modules of the CFA library 118 including but not limited to a dithering module 122, a look-up-table module 124, a CFA mapping module 126, a pixel group selector 128, and a C-information extractor 130. In certain embodiments, memory 114 may store at least a portion of information obtained by the CFA library 118 and the information associated with the look-up-table module 124.

The interface 106 may allow a user of the computing device 102 to request and consume electronic content, such as an eBook, via the electrophoretic display 108. Various information relating to the control and the processing of data may be presented to the user via the interface 106 which may include any suitable graphical user interface, command line interface, menu-driven user interface, touch user interface, voice user interface, form-based user interface, natural language user interface, and mobile user interface (e.g., graphical and touch-sensitive display features associated with mobile computing devices such as smartphones and tables). The display driver 112 may be set by the processor 104 to control image rendering on the electrophoretic display 108 in accordance with selected resolution, refresh rate, color depth, color profiles, orientation, etc.

In some aspects, the electrophoretic display 108 of the computing device 102 includes a CFA to display color contents stored in its frame buffer (e.g., a portion of memory 114). In response to receiving an RGB888 image, the computing device 102 may request functionalities provided by the CFA library 118 via the API 116 to format the framebuffer data such that the electrophoretic display 108 has strong patterns to display color contents.

Figure 2:
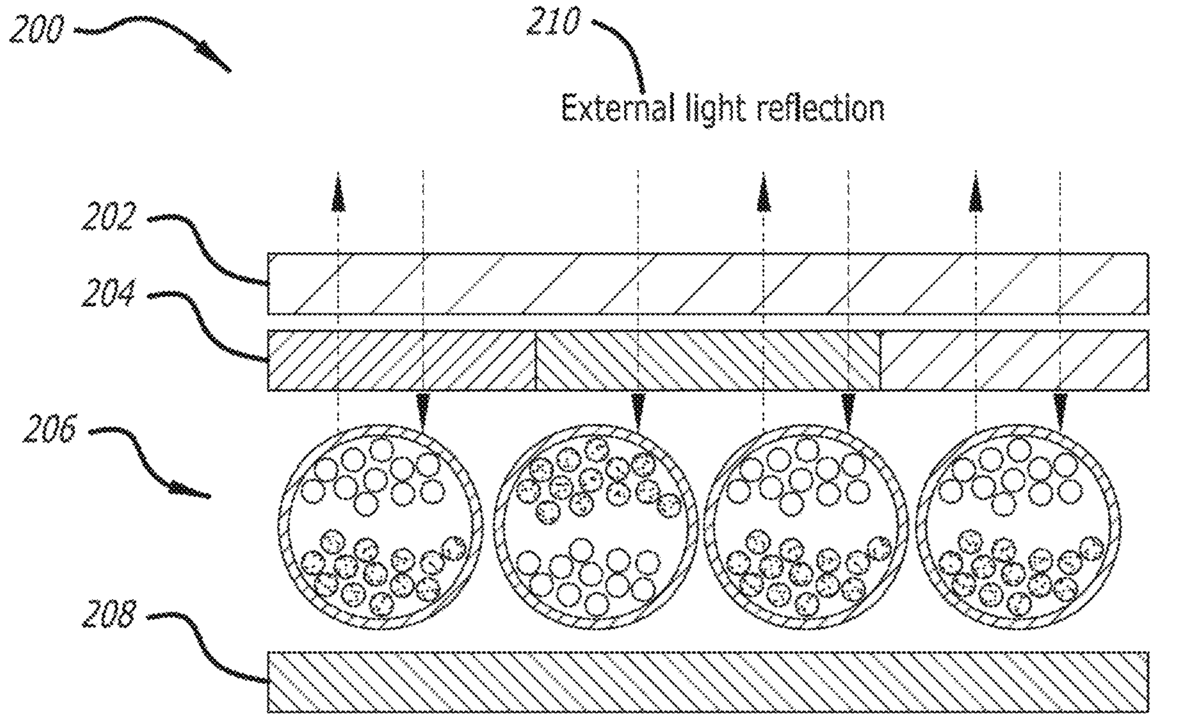
FIG. 2 illustrates a simplified example display stack that may be implemented by an electrophoretic display, in accordance with various aspects of the present disclosure.

FIG. 2 illustrates a simplified example display stack 200 that may be implemented by the electrophoretic display 108 of FIG. 1 for supporting displaying color contents. The display stack 200 may include a front light layer 202, a printed CFA 204, a monochrome ink panel 206, and an active matrix TFT backplane 208. Unlike conventional black and white displays associated with certain computing devices, the display stack 200 incorporates a printed CFA 204 on top of the monochrome ink panel 206 for creating full-color images. CFAs generally operate based on the selective absorption and transmission of light wavelengths. Light itself is composed of multiple colors, each corresponding to a certain range of wavelengths. CFAs can selectively absorb or transmit light of specific wavelengths based on their material properties. On a display screen of the electrophoretic display 108, each pixel typically contains red, green, and blue sub-pixels. Each sub-pixel may have a corresponding color filter, allowing light of the respective color to pass through. By controlling the brightness of each sub-pixel, the display can generate a wide range of colors at each pixel point.

As shown in FIG. 2, external light or front light 210, transmitting through the front light layer 202 and the printed CFA 204, may be reflected when the microcapsules of the monochrome ink panel 206 display white; otherwise, it is absorbed. The printed CFA 204 may include a combination of red (wavelengths approximately 620-750 nanometers), green (wavelengths approximately 540-580 nanometers), and blue (wavelengths approximately 460-500 nanometers) filters. For example, a red filter only allows red light to pass through while absorbing other colors of light. The three colors are the basis of human color perception and can be mixed to produce almost all other colors. By adjusting the relative intensity of these three colored light sources, a wide range of colors can be generated, from black to white and various shades in between.

Figure 3:
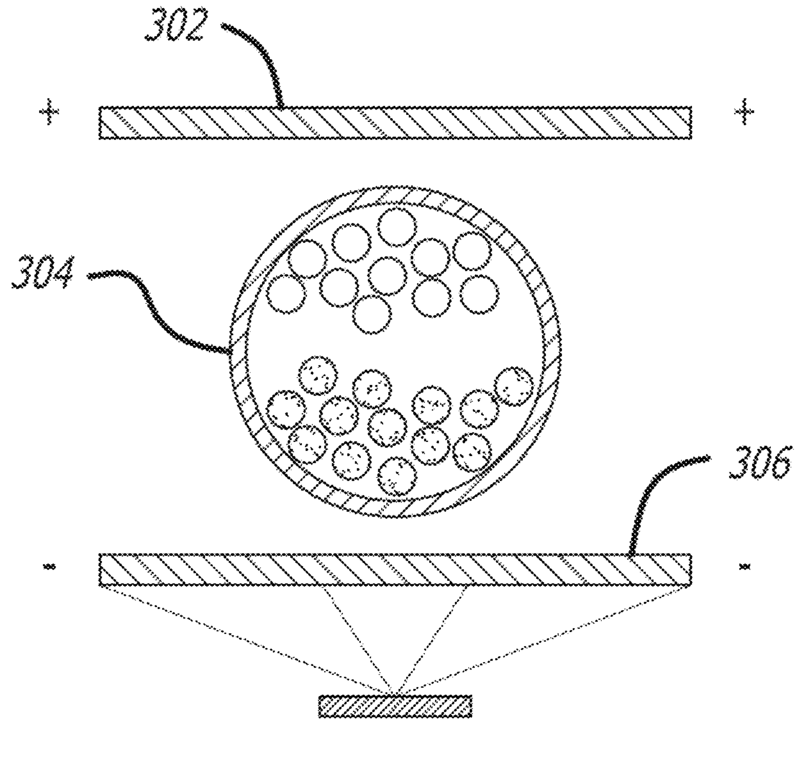
FIG. 3 illustrates an example two pigment electronic system including microcapsules.

The monochrome ink panel 206 contains pigment particles (microcapsules), charge controlling agents (CCAs), nonpolar solvent, and various additives. These particles can be driven by an external electric field after they are surface treated and charged by CCAs. Specific distributions of the particles may be controlled by a selected wave form, which results in different reflectance as gray level or grayscale. Referring to FIG. 3, an example two pigment electronic ink system may include millions of tiny microcapsules, each about the diameter of a human hair (100 μm). Each microcapsule may contain positively charged white particles (e.g., $TiO_2$) 302 and negatively charged black particles (e.g., carbon black) 306 suspended in a clear fluid 304. When a positive or negative electric field is applied, corresponding particles move to the top of the microcapsule where they become visible to the viewer. This makes the surface appear white or black at a specific location.

The TFT backplane 208 may comprise a layer of amorphous silicon or low-temperature polysilicon transistors on top of a glass substrate. This TFT backplane 208 may enable the control of individual pixels through metal interconnects and electrodes connected to each other and to external sources such as the processor 104 of the computing device 102. In one embodiment, the TFT backplane 208 may be configured with pixel data control information received from e.g., display driver 112 of FIG. 1 to drive liquid crystals or electrophoretic ink particles within each pixel. The resulting image displayed on the screen may be generated based on a combination of controlled electric fields, light transmission through the monochrome ink panel 206, and color filtering by the printed CFA 204.

In some embodiments, the TFT backplane 208 may be configured to have a specific orientation or angle relative to other components such as the monochrome ink panel 206 or the printed CFA 204 to optimize image quality by minimizing parallax effects during display. This ensures that images appear sharp and clear even at different viewing angles.

The printed CFA 204 may have millions of tiny filters arranged in a grid-like patterned structure atop an optically clear substrate material, such as glass or plastic film. The printed CFA 204 works collectively with the monochrome ink panel 206 and the TFT backplane 208 to create full-color images by controlling which pigments are visible through each sub-pixel. In one embodiment, the microcapsules beneath certain filters (e.g., red filters) of a printed CFA may be configured to appear white and all others black, causing the screen to display red. This principle applies similarly for blue, green, and all other colors within a supported color space. When all of the microcapsules are white, they reflect red, green, and blue lights at the same time. Due to additive color mixing and the resolution of human eyesight, one can perceive white on the screen. This can also be done on the other non-primary colors through different color mappings.

By adjusting the microcapsules to different grayscales, the brightness level of the color above it may be controlled. Each microcapsule has 16 grayscale levels, resulting in a total RGB color space of $16^3$=4,096 colors. For example, if the microcapsules beneath a green pixel of a printed CFA are set to gray, it will cause a darker green to be displayed for that pixel, potentially shifting the overall image towards an orange hue.

In accordance with various embodiments of the present disclosure, when an RGB image is written into a frame buffer, it undergoes a mapping algorithm that converts it to a grayscale representation (e.g., 5 bit followed by 4 bit), which is then used to control the microcapsules. Such a mapping algorithm may convert the RGB24 color space image to the 4,096 colors based on the printed CFA pattern on the screen. For each pixel in the RGB image, the mapping algorithm may extract the red (R), green (G), and blue (B) values and then calculate a single grayscale intensity value based on the RGB components. For example, this may be done using a weighted sum of the R, G, and B values: Grayscale=0.299×R+0.587×G+0.114×B. The weights (0.299, 0.587, 0.114) may be chosen because the human eye is more sensitive to green light than to red or blue. These weights may reflect the relative luminance of each color channel as perceived by human vision. Alternatively, different weights may be used, or a simple average of the three components may be applied. The resulting grayscale values may be stored in the frame buffer associated with the electrophoretic display 108 of FIG. 1.

In the frame buffer, each pixel now has a single intensity value instead of separate R, G, and B components. Once the entire image has been processed, the frame buffer may contain a grayscale version of the original image, which can be displayed on the screen or further processed. The mapping algorithm used to convert an RGB image to grayscale balances the contributions of the red, green, and blue components to create a grayscale image that maintains the visual characteristics of the original image in terms of brightness and contrast.

Figure 4:
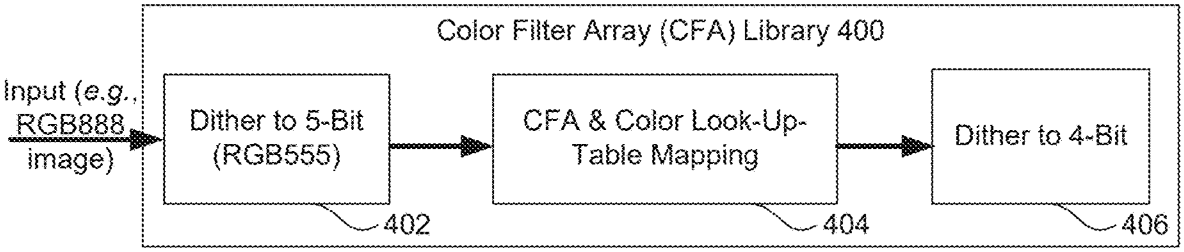
FIG. 4 illustrates a block diagram illustrating example functionalities provided by a CFA library, in accordance with various aspects of the present disclosure.

FIG. 4 is a high-level design block diagram illustrating example functionalities provided by a CFA library 400 (the CFA library 118 of FIG. 1), in accordance with aspects of the present disclosure. In response to obtaining an original signal, which may be an image at a higher bit depth (e.g., 8-bit, 16-bit, or higher), a first function 402 of the CFA library 400 may be configured to perform dithering on the original signal while minimizing information loss. The bit depth of an image generally refers to the number of bits used to represent the color of each pixel. A higher bit depth allows for more shades of color, resulting in smoother gradients. For example, for an RGB888 image, there are 8 bits for each of the red, green and blue channels and 24 bits per pixel, which allows for 256 shades per color channel, resulting in a total of 16,777,216 (256×256×256) possible colors. When the bit depth of an image becomes lower, the number of available colors is limited, causing abrupt transitions between colors and resulting in visible bands. This so-called banding issue is a visual artifact where smooth color gradients appear as distinct bands rather than seamless transitions.

In one embodiment, referring to FIGS. 1 and 4, in response to receiving an API call (e.g., via the API 116) and an original RGB888 image, the CFA library 118 may execute the dithering module 122 to dither the RGB888 image to an RGB555 image in order to reduce the original signal's bit depth to 5 bits while minimizing the banding issue. For an RGB555 image, there are 5 bits for each of the red, green, and blue channels. In some implementations, the total bits per pixel may include an additional unused or alpha bit in addition to 15 bits per pixel, making it 16 bits per pixel in total. Each color channel, for a given pixel with a 5 bit red value, a 5 bit green value, and a 5 bit blue value, can have 32 possible values (0-31), resulting in a total of 32,768 (32×32×32) possible colors.

Dithering adds noise to the image, which is often imperceptible to the human eye but effectively reduces the visibility of banding. Dithering also reduces quantization errors when reducing the bit depth of a digital signal (an image or audio).

A controlled amount of noise may be determined and added by the dithering module 122 to the original RGB888 image. In one embodiment, this noise may be generated randomly or pseudo-randomly by the dithering module 122 and is selected so that its amplitude is small enough not to be perceptually noticeable but large enough to mask the quantization errors. For example, random noise may be added to each pixel, with a range between −0.5 and 0.5 of a quantization step. The noisy signal may then be quantized to the target bit depth, in this case, 5 bits. Quantization may involve mapping a range of input values to a smaller set of output values. For a 5-bit system, there are 25=32 possible values. The quantized signal is represented with only 5 bits per sample. The added noise may spread out the quantization errors, making them less noticeable.

In accordance with certain aspects, blue noise dithering may be employed to distribute error between neighboring pixels in a way that minimizes visible artifacts and preserves overall color fidelity. Blue noise has a specific frequency distribution where the energy is concentrated at higher frequencies. As a result, blue noise appears as a fine, grainy texture rather than as coarse patterns or clusters. According to one implementation, blue noise dithering may be applied to each individual channel (red, green, or blue) separately before combining them into a single RGB555 value. In one embodiment, a blue noise mask, which is a grayscale pattern, may be used and have the same size as the input image. The mask values may be in the same range as the input image (e.g., 0-255 for 8-bit grayscale). For each pixel in the image, the pixel value from the input image may be compared to the corresponding value from the blue noise mask at the same pixel location. The blue noise mask may be used for determining how the color channel's intensity is quantized or mapped to a limited color palette. The dithering decision may be based on: if a color channel pixel value>blue noise mask value→set higher quantized level; if a color channel pixel value<blue noise mask value→set lower quantized level.

Blue noise dithering may be well suited for implementation in parallel processing disclosed in the present disclosure for several reasons. For example, blue noise dithering involves making decisions without requiring information regarding the region around each pixel. This allows the image to be divided into smaller regions or tiles that can be processed independently in parallel. Each processing unit can work on a specific region without needing to communicate extensively with others, reducing the overhead of synchronization. Further, the process of determining the dithered value for each pixel in blue noise dithering is relatively uniform across the image, and each pixel requires a similar amount of computation. Due to this uniform workload distribution, parallel tasks are balanced, which allows for efficient parallel processing. Each processing unit may perform its work without significant variations in processing time, leading to better utilization of computational resources. Moreover, since each pixel's dithering decision is not influenced by its neighbors, the need for synchronization is avoided. Reduced synchronization overhead may achieve high performance in parallel processing environments. Blue noise dithering's localized nature minimizes the need for frequent synchronization, allowing for more efficient parallel computation.

In one embodiment, the dithering module 122 may be configured to generate a blue noise mask (or pattern) to produce noise with the desired spectral properties. An example mask may have random, yet controlled, distribution characteristics, ensuring that it does not introduce noticeable patterns or artifacts into the image. The generated blue noise mask may have a predefined size and location with respect to the electrophoretic display that can be predefined based on desired performance characteristics. A larger mask produces better dithering results, whereas a smaller mask reduces the resource burden on the device. However, the width of the blue noise mask will be a multiple of the size of a processor register used in the device to maximize the opportunity for parallelism. For instance, if each register can operate on 8 pixels, then the blue noise mask should have a width that is a multiple of 8 and will be aligned with the first pixel in a particular register and the last pixel in another register. In one example, the blue noise mask may comprise a 64 by 64 mask mapped to a central pixel region within the electrophoretic display, in which case parallelism can be achieved across the full width of the blue noise mask (in a series of operations acting on 8 pixels at a time). The blue noise mask may be scaled to a small amplitude relative to the range of pixel values, ensuring that application of the blue noise mask will subtly modify the image without overwhelming the original content.

Next, the noisy image may be quantized to the target bit depth or color space (e.g., 5 bit). During quantization, the added noise further reduces the visibility of banding or other quantization artifacts.

The resulting RGB555 format, which has smoother gradients and fewer visible artifacts, may be utilized for the subsequent color enhancement function. As shown in FIG. 4, a CFA and color look-up-table (CLUT) mapping function 404 may be collectively used to handle color enhancement and CFA mapping function. To enhance the visual appeal of the images, different CLUTs may be employed to fine-tune the colors. This step involves assigning a CFA channel value corresponding to each input pixel based on its position within the frame buffer, ensuring accurate assignment of colors based on both original and modified values during dithering.

For example, the look-up-table module 124 of the CFA library 118 of FIG. 1 may provide 16-bit LUTs with 65k entries per channel (red, green and blue) to store pre-calculated values of RGB555 pixels corresponding to specific positions within an image.

In another embodiment, CLUT mapping may be integrated into CFA mapping function. As a result, CFA channels may be directly mapped onto selected look-up-tables without requiring separate processing steps for each channel. This approach may reduce memory usage and improve overall performance while maintaining accurate color representation throughout the image.

In an alternate embodiment, CLUT mapping may be implemented using adaptive tone curve adjustments instead of pre-defined LUTs. Specifically, a combination of gamma correction factors may be used to adjust brightness levels based on pixel position within the frame buffer. This approach may allow for more flexibility in fine-tuning colors and may be used with various display devices having different color gamut characteristics. CLUT mapping function may also handle transparent or alpha-channel images differently than opaque values during processing.

Although the input and output formats of color enhancement function via CLUTs may remain RGB555, the CLUT mapping may be extended to support color spaces beyond RGB888 by modifying the look-up-tables and CFA mapping accordingly. For example, the CFA library 400 may integrate YUV data format image processing into the function 404 for improved compatibility with various display devices having different color formats.

After the color enhancement, the CFA library 118 of FIG. 1 may execute the CFA mapping module 126 to perform CFA mapping functions. For example, based on the display panel's pixel arrangement, 16 levels of brightness may be displayed for either red, blue, or green at a single pixel position. Therefore, each of the input RGB555 pixel may be mapped to a single-channel pixel by retaining only the pixel value corresponding to that position and discarding the other two channels' values. For example, a medium red color in an RGB888 may be represented as 0x80, 0x00, 0x00 (128 red, 0 green, 0 blue). The same color in an RGB555 image may be 0x10, 0x00, 0x00 (16 red, 0 green, 0 blue).

Similar to the first function 402, dithering 406 may be carried out by the CFA library 400 to convert the 5-bit image to a 4-bit image to avoid banding issues. When an electrophoretic display can only represent 16 levels of grayscale, the final output is a 4-bit image. In a preferred embodiment, the dithering module 122 of the CFA library 118 may similarly apply blue noise dithering for the 4-bit dithering function 406 of the CFA library 400 to distribute the quantization errors in a way that is less perceptible to the human eye, resulting in a smoother and more visually pleasing image.

Alternatively, the dithering module 122 of FIG. 1 may apply ordered dithering to both the 5-bit dithering function 402 and the 4-bit dithering function 406. Ordered dithering converts grayscale images into binary images (black and white) or reduces the color depth of an image while preserving its overall appearance. For example, the dithering module 122 may determine a small, fixed matrix of threshold values, called a dither matrix. The size of the matrix can vary (e.g., 2×2, 3×3, 4×4), and each cell in the matrix may contain a value between 0 and 1 (or equivalent ranges in other scales). An image may then be processed pixel by pixel. For each pixel, the corresponding value in the dither matrix is used as a threshold. The pixel's intensity is compared against the threshold. If the pixel's intensity is greater than the threshold, it is set to white (or a higher intensity color); otherwise, it is set to black (or a lower intensity color). The dither matrix may be tiled across the entire image, and each pixel uses the threshold value from the corresponding position in the dither matrix. If the image is larger than the dither matrix, the matrix is repeated (tiled) across the entire image. For example, if an image is 100×100 pixels and a 2×2 matrix is selected by the dithering module 122, the matrix is applied 50×50 times. Since ordered dithering performs a simple comparison for each pixel, it is computationally efficient and easy to implement.

Figure 5:
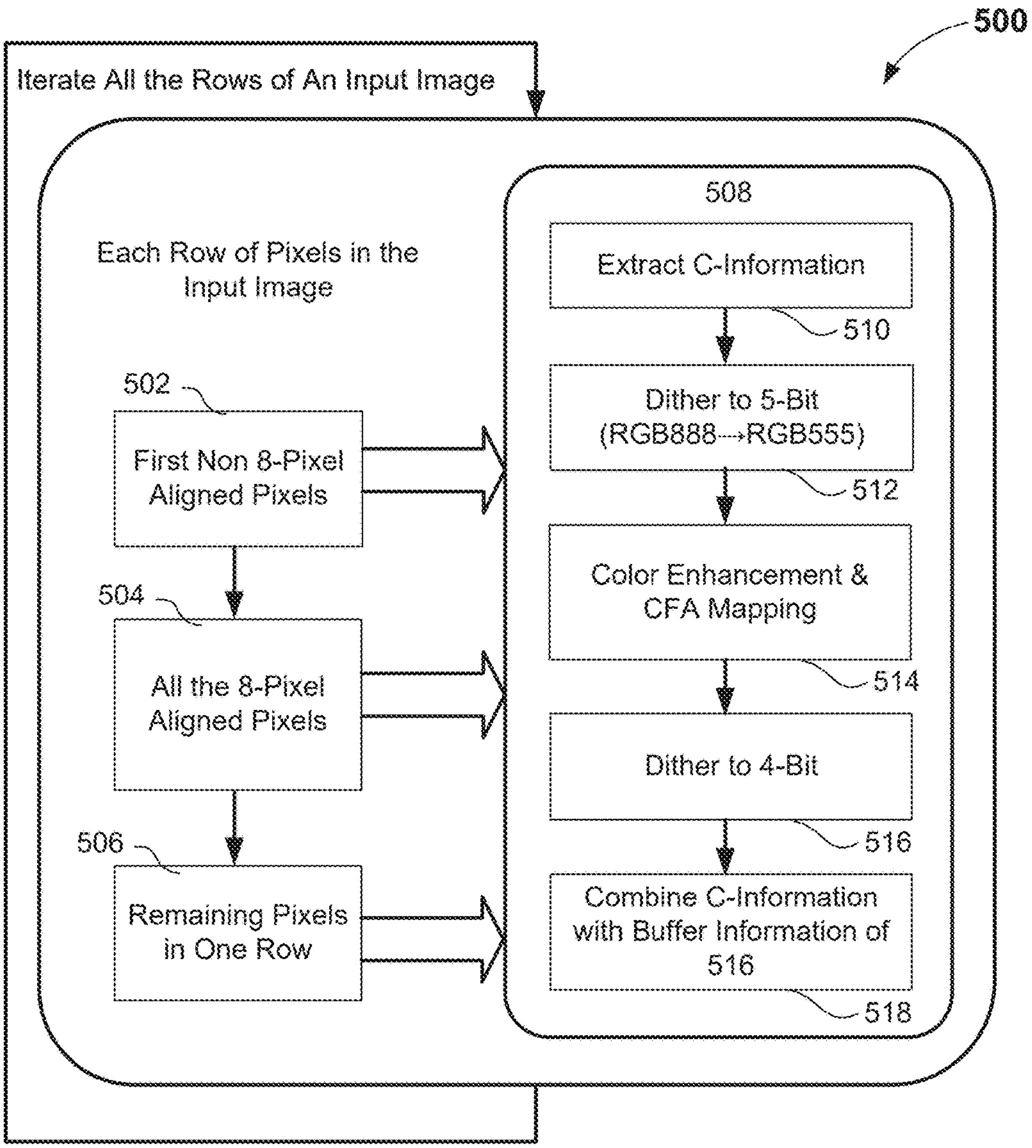
FIG. 5 illustrates a workflow for parallelizing determination of image grayscale pixel values based on their CFA locations stored in a frame buffer of an electrophoretic display device, in accordance with various aspects of the present disclosure.

FIG. 5 illustrates a workflow 500 for parallelizing determination of image grayscale pixel values based on their CFA locations stored in a frame buffer of an electrophoretic display device, in accordance with aspects of the present disclosure. In response to receiving an input image (e.g., a 24-bit RGB image) via an API call, according to one embodiment, the CFA library 118 of FIG. 1 may start iterating all the rows of the input image one by one from top to bottom. In certain applications, images are received or transmitted as a stream of data. Image processing line by line may begin as soon as the first line is received, without waiting for the entire image to load. When implemented in real-time, such as live video processing or scanning devices, processing images line by line by the CFA library 118 allows for immediate output or analysis. However, it should be appreciated that other processing methods such as column-by-column processing, block-based processing, non-sequential access processing, or multiple iterations processing may also be utilized.

Within each row of pixels, still referring to FIGS. 1 and 5, the pixel group selector 128 may determine multiple processing groups: a first group 502 of non-8-pixel aligned pixels, a second group 504 including all of the 8-pixel aligned pixels for parallel processing, and a third group 506 including the remaining pixels in the same row. The first group 502 comprises a subset of the left-most pixels in a row that do not comprise a full register of pixels. The second group 504 comprises a region including only complete registers of pixels. Finally, the third group 506 comprises a right-most pixel region that does not comprise a full register of pixels. In one aspect, the second group 504 may be processed in parallel because the region only includes complete registers of pixels, such that parallel processing on each register within the second group 504 will operate on the entire set of pixels in this region. This allows for the use of parallel computing techniques like single instruction multiple data (SIMD) or multi-threading, which can significantly speed up processing. The pixels at the edges of each row (first group 502 and third group 506) often lack the full set of neighboring pixels needed for certain operations (e.g., convolution). Padding, boundary conditions or other similar techniques may be needed to handle these edge cases. Separating the edge pixels of each row of an image may allow for these pixel regions to be handled separately, ensuring accuracy without complicating the parallel processing of the second group 504. Moreover, by processing the aligned pixels in the second group 504 in parallel, memory access patterns may be optimized, thereby reducing cache misses and improving the overall performance. In addition, the parallel processing of the second group 504 may be scaled across multiple processors or cores to add further efficiency, while the edge processing remains lightweight and manageable because it addresses only a small fraction of the pixels regardless of the image size.

Figure 6:
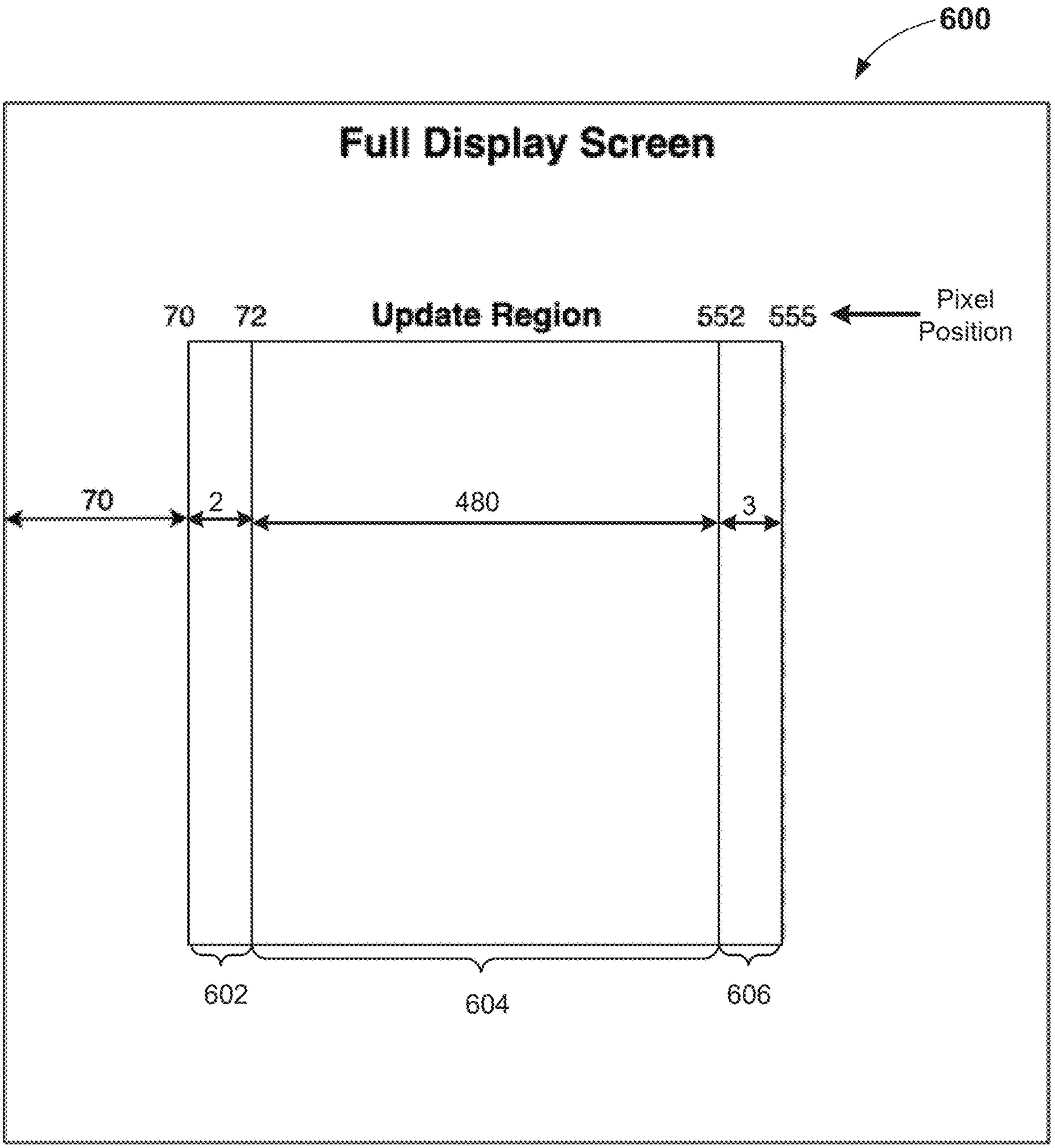
FIG. 6 illustrates a number of pixel processing regions of an example electrophoretic display screen, in accordance with various aspects of the present disclosure.

FIG. 6 illustrates an example full display screen 600 of an electrophoretic display device including two edge regions or boundary pixel regions 602, 606 and a central update region 604. The left edge region 602 may correspond to the first group 502 of non-8-pixel aligned pixels of FIG. 5, and the right edge region 606 corresponding to the third group 506 including the remaining pixels in the same row. The central update region 604 of FIG. 6 may correspond to the second group 504 including all of the 8-pixel aligned pixels for parallel processing. According to some aspects, a fixed index defining start-of-set columns may be used to allow for parallelization across multiple pixel groups within each row of an image while maintaining pixel alignment integrity through handling edge cases or boundary conditions. For example, when pixels are arranged in an RGB stripe pattern, each pixel may include three subpixels: red, green, and blue. This arrangement typically starts with a red subpixel, followed by green and then blue. The pixel group selector 128 of the CFA library 118, as shown in FIG. 1, may locate the first red subpixel in the upper left corner of the central update region 604 of FIG. 6 as the starting point of the update region 604 (504 of FIG. 5) which is a multiple of 8 pixels wide. It should be appreciated that the starting subpixel color varies based on the specific technology and pixel arrangement used in a display. The starting subpixel and the width of the update region 604 may be determined based on several factors, including power consumption of the electrophoretic display device, visual impact, hardware capabilities, and the specific requirements for an application.

Referring to FIGS. 1 and 5, for the first group 502 of non-8-pixel aligned pixels, the CFA library 118 may use pure C code to perform the processes as shown in block 508. In one aspect, the processor 104 of the computing device 102 may execute a C-information extractor 130 to obtain information about whether a pixel is black or white (process 510) and integrate this information into information stored in a final buffer (at the lowest 1 bit) (process 518). This C-information may be used for subsequent compressed sparse row (CSR) process within the present kernel to ensure accurate color reconstruction when dealing with edge cases where adjacent rows may have different brightness levels, thereby maintaining consistency throughout the display area.

For the second group 504 including all the 8-pixel aligned pixels, the processor 104 may handle 8 pixels simultaneously in accordance with the processes of the block 508 to accelerate computation, resulting in significant performance improvements. In one aspect, processes 512, 514, and 516 collectively correspond to the CFA library 400, as disclosed above with respect to FIG. 4. For example, the processor 104 may execute multiple instructions in a single clock cycle and leverage vectorized operations to simultaneously determine image grayscale pixel values of a plurality of pixels (e.g., 8 pixels) based on their CFA locations. A vector generally refers to a collection of multiple data elements of the same type (e.g., integers or floating-point numbers). The processor 104 may process multiple vectors in parallel using SIMD instructions. When processing large sets of data, a major performance limiting factor is the amount of central processing unit (CPU) or graphics processing unit (GPU) time needed to perform data processing instructions. This time depends on the number of instructions for processing an entire data set, and the number of instructions depends on how many items of data each instruction can process. For instructions that use single instruction single data architecture, each instruction performs its specified operation on a single data source. Processing multiple data items may require multiple instructions. By contrast, in one preferred embodiment, the processor 104 of the present disclosure may perform the same operation simultaneously for 8 pixels. Each instruction executed by the processor 104 result in n operations occurring in parallel for 8 pixels, where n is the number of lanes that the input vectors are divided into. Each operation is contained within a lane (the same element position in the input and output registers). There is no carry or overflow from one lane to another. The number of lanes in a vector may be determined based on the size of the vector and the data elements in the vector.

According to some implementations, the processor 104 may determine a plurality of abstractions for the underlying hardware registers to represent vectors and single instruction multiple data operations. To work with vectors, data from memory are loaded into selected vector registers. Once data is loaded into a vector, various operations may be carried out on the data, such as arithmetic operations (element-wise addition, subtraction, multiplication, and division), bitwise operations (bitwise AND, OR, XOR, etc.), and comparison operations (comparison of elements in two vectors). These operations are performed simultaneously on all elements of the vector. Example vector types may include but not limited to integer vectors and floating-point vectors. Example vector register types may include but not limited to 64-bit register types and 128-bit register types. After performing operations on vectors, the results may be stored back into memory.

In yet another aspect, the processor 104 may determine a fixed index defining the start of defined sets of columns of pixels for parallel processing. Referring to FIG. 6, according to one embodiment, within the central update region 604, for a first update to a set of pixels in a row, parallelizing processing may be carried out by locating the first red subpixel in the upper left corner of the central update region 604 of FIG. 6 as the starting point. For a second update to a set of pixels in the row, parallelizing processing may be based on the same fixed index defining the start of defined sets of columns.

For the remaining pixels of the third group 506, the processor 104 may continue to use C code to perform the processes 510, 512, 514, 516, and 518, as shown in block 508.

Switching between C code and vectorized operations during image data processing, the present disclosure employs heuristics based on pixel alignment to determine whether to utilize optimized vectorized operations for aligned pixel data or fall back to pure C-code handling of non-aligned pixels (e.g., data that is not perfectly divisible by the vector size). As discussed above with respect to FIGS. 1, 4, 5 and 6, the present disclosure effectively utilizes both C code and vectorized operations (e.g., single instruction multiple data instructions) in processing and optimizing image data line by line at the hardware level, particularly with respect to parallelism, performance, and code complexity. For non-8-pixel aligned pixels (e.g., 502 and 506 of FIG. 5) within each row or column (e.g., when only partial pixel data is available), pure C code operations are scalar and operate on single data elements at a time. For example, adding two arrays element-by-element in a loop handles each pair of elements sequentially. Each operation may access memory individually. For all the 8-pixel aligned pixels (e.g., second group 504 of FIG. 5), the present disclosure utilizes vectorized operations to process 8 pixels simultaneously to accelerate data transfer between registers within a single instruction set architecture command.

In some embodiments, although the pure C code operations on the non-8-pixel aligned pixels within each row may be performed sequentially, limited parallelism may be achieved using techniques like multi-threading or GPU offloading.

In processing a small amount of non-8-pixel aligned pixels within each row, pure C code operations use standard C syntax and constructs whose code is highly portable and maintainable across different platforms and architectures (x86, ARM, etc.) with minimal changes.

Figure 7:
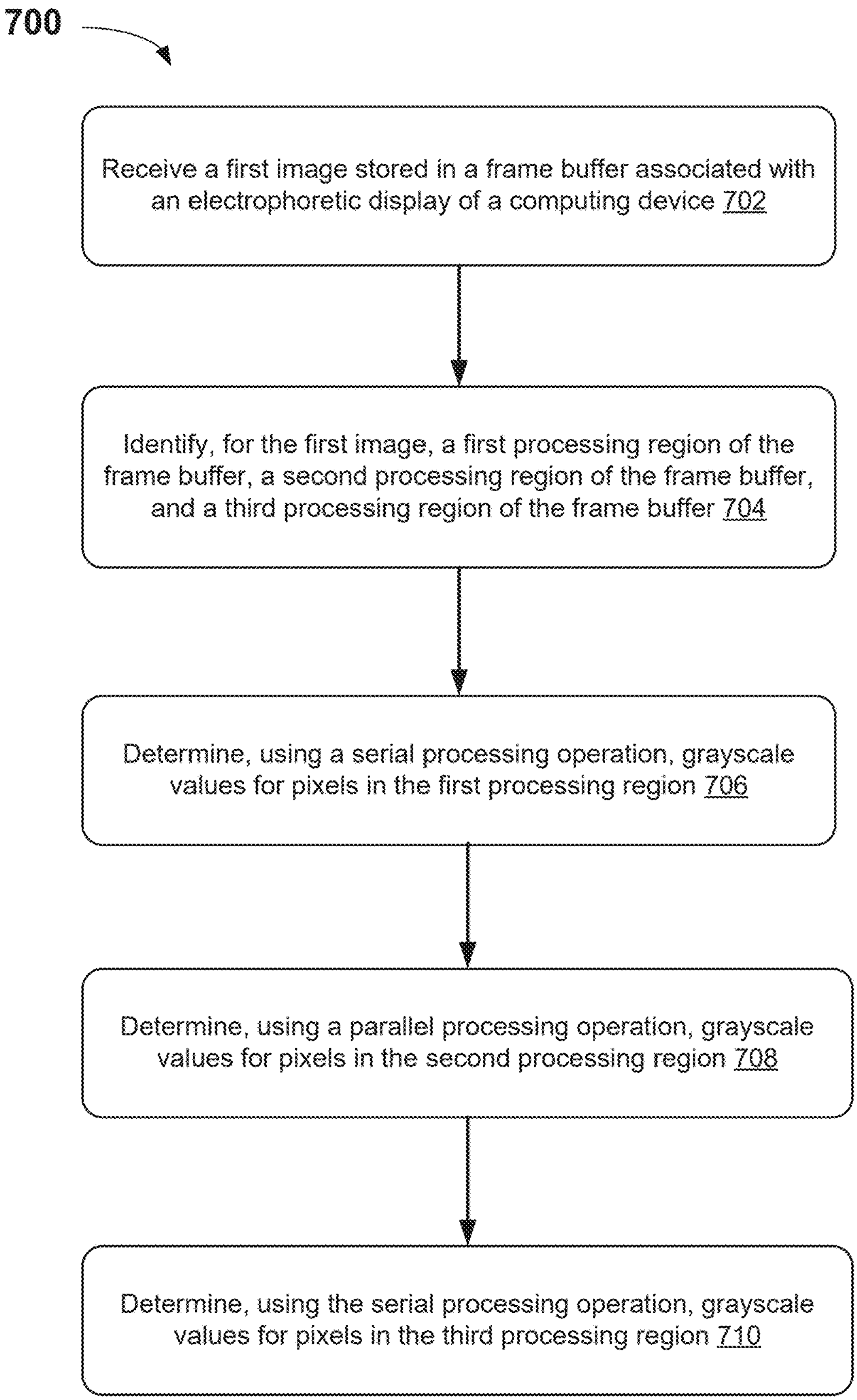
FIG. 7 illustrates a flow chart illustrating an example process for parallelizing determination of grayscale pixel values based on their CFA locations in a frame buffer associated with an electrophoretic display device, in accordance with various aspects of the present disclosure.

FIG. 7 is a flow chart illustrating an example process 700 for parallelizing determination of grayscale pixel values based on their CFA locations in e.g., a frame buffer associated with an electrophoretic display device, in accordance with embodiments of the present disclosure. The process 700 of FIG. 7 may be executed by one or more computing devices. The actions of process 700 may represent a series of instructions comprising computer-readable machine code executable by a processing unit (e.g., CPU or GPU) of a computing device. In various examples, the computer-readable machine code may be comprised of instructions selected from a native instruction set of the computing device and/or an operating system of the computing device. Various actions in process 700 may be described above with reference to elements of FIGS. 1, 4, 5, and 6. Although shown in a particular order, the steps of process 700 may instead be performed in a different order. Additionally, various steps may be performed in parallel in various implementations. Further, some steps may be omitted and/or other steps may be added in accordance with the techniques described herein.

Process 700 may begin at action 702, at which a first image may be received and stored in a frame buffer associated with an electrophoretic display of a computing device. For example, the first image may be a 24-bit RGB888 image to be displayed on the electrophoretic display which includes black and white ink and a CFA overlaid thereon. Processing may continue at action 704, which includes identifying, for the first image, a first processing region of the frame buffer, a second processing region of the frame buffer, and a third processing region of the frame buffer. The processing regions may indicate non-parallel processing regions and a parallel processing region of the electrophoretic display.

The first image may be processed iteratively line by line based on the processing regions to determine a grayscale value of each pixel based on a CFA location of each pixel in the frame buffer. In one aspect, action 706 may include determining, using a serial processing operation, grayscale values for pixels in the first processing region. Action 708 includes determining, using a parallel processing operation, grayscale values for pixels in the second processing region. Action 710 includes determining, using the serial processing operation, grayscale values for pixels in the third processing region. For example, this iterative processing in each processing region may include extracting information relating to whether each pixel is black or white in the received RGB888 image, and performing a first dithering to the RGB888 image to generate a second image having a lower bit depth (e.g., RGB555 format). Further, a color filter array channel may be determined to correspond to each pixel of the second image, and a color filter array channel value corresponding to the color filter array may be selected. A second dithering may be performed to the second image to generate a third image having a bit depth lower than that of the second image. The third image may be saved in the frame buffer by combining the information relating to whether each pixel is black or white, and the third image contains information to indicate the grayscale value of each pixel.

In some embodiments, the interactive processing of the first image line by line based on the fixed index in the non-parallel processing regions may use C code and in the parallel processing region use vectorized instructions on a selected group of pixels (e.g., eight pixels) in a same row simultaneously. The parallel processing region may have a size that is a multiple of eight pixels. The non-parallel processing regions may include boundary regions of the electrophoretic display, and each non-parallel processing region may include pixels on a same row that are not divisible by a vector size selected for performing the vectorized instructions in the parallel processing region.

In yet another embodiment, the first dithering of the original RGB888 image and the second dithering of the RGB555 image may use blue noise dithering techniques.

According to some implementations, to enhance the visual appeal of images, different color lookup tables may be used to fine-tune colors of the RGB555 image.

In accordance with one or more implementations, an electronic device includes a display assembly comprising first color components having a first color and a first charge polarity, second color components having a second color different from the first color, a thin film transistor assembly, a color filter array; one or more processors; and one or more computer readable media storing processor executable instructions which, when executed using the one or more processors, cause the electronic device to perform operations. The operations include determining, based on first data indicating one or more boundaries of one or more dither regions, a first set of pixel locations in a first line for parallel processing; storing, in a first vector memory register, respective pixel color data for each respective pixel location of the first set of pixel locations that indicates a respective set of color channel values for the respective pixel location; determining, using one or more vector operations utilizing dither map data and the pixel color data stored in the first vector memory register, respective dithered pixel color data for each respective pixel location of the first set of pixel locations; determining, utilizing one or more vector operations and based on the dithered pixel color data for the first set of pixel locations and color filter array data indicating a respective color channel associated with each respective pixel location of the first set of pixel locations, respective gray scale data for each respective pixel location of the first set of pixel locations; and updating, based on the respective gray scale data for a first pixel location of the first set of pixel locations, the display assembly by causing the thin film transistor assembly to effect movement of one or more of the first color components corresponding to the first pixel location. A vector register may generally include a type of CPU/GPU register designed to store vectors, which are sequences of multiple data elements (e.g., an array), and may be used in single instruction multiple data operations where the same operation is performed on multiple data points in parallel. A vector memory register may refer to such a register that interacts with or resides in memory for storing multiple values as a group. Static memory may generally refer to static random-access memory (SRAM). Unlike dynamic RAM (DRAM), which needs constant refreshing, SRAM may be configured to use latches to store bits and retains its content as long as power is supplied. A latch is a basic memory element made using transistors that can hold a bit (0 or 1). These transistor-based latches may be configured to physically store data in a corresponding register. In an embodiment, the first vector memory register may include static memory comprising transistors implementing latches.

It should be appreciated that the term "non-transitory computer or machine readable medium" may include a single medium or multiple media (e.g., one or more caches) configured to store the at least one instruction. The term "machine readable medium" may include any medium that is capable of storing, encoding, or carrying instructions for execution by all modules of the computing device 102 and the CFA library 118 and that cause these modules to perform at least one of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

Further, the terms "module," "driver," "selector," and "extractor" in FIG. 1 or other similar terms as used herein may refer to a real-world device, component, or arrangement of components and circuitries implemented using hardware, such as by an application specific integrated circuit (ASIC) or field-programmable gate array (FPGA), for example, or as a combination of hardware and software, such as by a microprocessor or microcontroller system and a set of instructions to implement the module's functionality, which (while being executed) transform the microprocessor system into a special purpose device. A "module," "driver," "selector," and "extractor" may also be implemented as a combination of the two, with certain functions facilitated by hardware alone, and other functions facilitated by a combination of hardware and software. Each "module," "driver," "selector," and "extractor" may be realized in a variety of suitable configurations, and should not be limited to any example implementation exemplified herein.

As set forth above, certain methods or process blocks may be skipped or omitted in some implementations. Blocks or operations may be added to some implementations. The methods and processes described herein are also not limited to any particular sequence or order, and the blocks or operations relating thereto can be performed in other sequences or orders that are appropriate. For example, described blocks or operations may be performed in an order other than that specifically disclosed, or multiple blocks or operations may be combined in a single block or state. For instance, two or more blocks or operations may be executed concurrently or with partial concurrence. The example blocks or operations may be performed in serial, in parallel, or in some other manner. For example, the order of execution of two or more blocks or operations may be scrambled relative to the order described. For instance, two or more blocks or operations may be executed concurrently or with partial concurrence. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of this disclosure is defined only by the claims, which are intended to be construed without reference to any definitions that may be explicitly or implicitly included in any incorporated-by-reference materials.

The invention claimed is:

1. A computer-implemented method comprising: receiving a first image stored in a frame buffer associated with an electrophoretic display of a computing device, wherein the electrophoretic display includes black and white ink and a color filter array overlaid thereon; identifying, for the first image, a first processing region of the frame buffer, a second processing region of the frame buffer, and a third processing region of the frame buffer; for each of the first, second and third processing regions, determining grayscale values for pixels by: extracting information relating to whether each pixel of the first image is black or white; performing a first dithering to the first image to generate a second image having a second bit depth, wherein the second bit depth is lower than a first bit depth;

determining a color filter array channel corresponding to each pixel of the second image based on the grayscale values in the first, second and third processing regions of the frame buffer; selecting a color filter array channel value corresponding to the color filter array channel for each pixel of the second image; performing a second dithering to the second image to generate a third image having a third bit depth, wherein the third bit depth is lower than the second bit depth; and storing the third image and the information relating to whether each pixel of the first image is black or white in the frame buffer, wherein the determining grayscale values for pixels in the first and third processing regions uses a serial processing operation, and the determining grayscale values for pixels in the second processing region uses a parallel processing operation.

2. The computer-implemented method of claim 1, comprising executing C code in performing the serial processing operation in the first and third processing regions, wherein the first and third processing regions comprise boundary regions of the first image.

3. The computer-implemented method of claim 1, comprising executing vectorized instructions in performing the parallel processing operation in the second processing region, wherein the second processing region has a size that is a multiple of eight pixels.

4. The computer-implemented method of claim 1, comprising:

performing the first dithering and second dithering using blue noise dithering techniques.

5. A method comprising:

receiving a first image stored in a frame buffer associated with an electrophoretic display of a computing device, wherein the electrophoretic display includes black and white ink and a color filter array overlaid thereon;

identifying, for the first image, a first processing region of the frame buffer, a second processing region of the frame buffer, and a third processing region of the frame buffer;

determining, using one or more serial processing operations, grayscale values for pixels in the first processing region;

determining, using one or more parallel processing operations, grayscale values for pixels in the second processing region; and determining, using one or more serial processing operations, grayscale values for pixels in the third processing region.

6. The method of claim 5, wherein each of the first and third processing regions includes pixels on a same row that are not divisible by a vector size selected for performing vectorized instructions for parallel processing operation.

7. The method of claim 5, comprising:

performing a first dithering to the first image having a first bit depth to generate a second image having a second bit depth, wherein the second bit depth is lower than the first bit depth; and performing a second dithering to the second image to generate a third image having a third bit depth, wherein the third bit depth is lower than the second bit depth.

8. The method of claim 7, comprising performing the first dithering and second dithering using Blue noise dithering techniques.

9. The method of claim 7, further comprising, for each pixel in the first and third processing regions:

extracting information relating to whether a pixel is black or white;

performing the first dithering;

determining a color filter array channel for the pixel based on its position within the frame buffer;

selecting a color filter array channel value for the pixel corresponding to the selected color filter array channel;

determining a grayscale value for the pixel based on the selected color filter array channel value;

performing the second dithering; and storing the third image and the information relating to whether each pixel of the first image is black or white in the frame buffer.

10. The method of claim 9, comprising executing C code in performing serial processing operation in the first and third processing regions.

11. The method of claim 7, further comprising, for groups of pixels in the second processing region:

applying simultaneously vectorized instructions on the groups of pixels to:

extract information relating to whether each pixel of the groups of pixels is black or white;

perform the first dithering;

determine a color filter array channel for each pixel based on its position within the frame buffer;

select a color filter array channel value for each pixel corresponding to the selected color filter array channel;

determine a grayscale value for each pixel based on the selected color filter array channel value;

perform the second dithering; and store the third image and the information relating to whether each pixel of the first image is black or white in the frame buffer.

12. The method of claim 11, wherein each group of pixels includes eight pixels, wherein the second processing region has a size that is a multiple of eight pixels.

13. An electronic device comprising:

a display assembly comprising first color components having a first color and a first charge polarity, second color components having a second color different from the first color, a thin film transistor assembly, a color filter array;

one or more processors;

one or more computer readable media storing processor executable instructions which, when executed using the one or more processors, cause the electronic device to perform operations comprising determining, based on first data indicating one or more boundaries of one or more dither regions, a first set of pixel locations in a first line for parallel processing, storing, in a first vector memory register, respective pixel color data for each respective pixel location of the first set of pixel locations that indicates a respective set of color channel values for the respective pixel location, determining, using one or more vector operations utilizing dither map data and the pixel color data stored in the first vector memory register, respective dithered pixel color data for each respective pixel location of the first set of pixel locations, determining, utilizing one or more vector operations and based on the dithered pixel color data for the first set of pixel locations and color filter array data indicating a respective color channel associated with each respective pixel location of the first set of pixel locations, respective grayscale data for each respective pixel location of the first set of pixel locations, and updating, based on the respective gray scale data for a first pixel location of the first set of pixel locations, the display assembly by causing the thin film transistor assembly to effect movement of one or more of the first color components corresponding to the first pixel location.

14. The electronic device of claim 13, wherein the display assembly is an electrophoretic display assembly, and wherein the electrophoretic display assembly comprises a plurality of microcapsules each containing some of the first color components and some of the second color components.

15. The electronic device of claim 13, wherein the dither map data comprises respective dither map data for each respective pixel location of the first set of pixel locations that indicates a respective dither map value for the respective pixel location, and wherein the one or more computer readable media store processor executable instructions which, when executed using the one or more processors, cause the electronic device to perform operations comprising storing, in a second vector memory register, the dither map data.

16. The electronic device of claim 13, wherein the one or more computer readable media store processor executable instructions which, when executed using the one or more processors, cause the electronic device to perform operations comprising determining, utilizing one or more vector operations and based on the dithered pixel color data for the first set of pixel locations, respective index data for each respective pixel location of the first set of pixel locations, and determining, for each respective pixel location of the first set of pixel locations using one or more lookup tables and the respective index data, respective fine-tuned color data that indicates a respective set of color channel values for the respective pixel location;

wherein the respective gray scale data for each respective pixel location of the first set of pixel locations is determined based on the respective fine-tuned color data for that respective pixel location.

17. The electronic device of claim 13, wherein the first set of pixel locations is a set of eight pixel locations.

18. The electronic device of claim 13, wherein a number of pixel locations in the first set of pixel locations is equal to a number of pixel locations for which respective pixel color data can be stored in the first vector memory register.

19. The electronic device of claim 13, wherein the first vector memory register is static memory comprising transistors implementing latches.

20. The electronic device of claim 13, wherein the one or more computer readable media store processor executable instructions which, when executed using the one or more processors, cause the electronic device to perform operations comprising after the updating of the display assembly by causing the thin film transistor assembly to effect movement of one or more of the first color components corresponding to the first pixel location, determining, based on the first data indicating one or more boundaries of one or more dither regions, a second set of pixel locations in the first line for parallel processing, determining respective gray scale data for each respective pixel location of the second set of pixel locations, and updating, based on the respective gray scale data for a second pixel location of the second set of pixel locations, the display assembly by causing the thin film transistor assembly to effect movement of one or more of the first color components corresponding to the second pixel location.

* * * * *